United States Patent
Macy

(10) Patent No.: US 12,523,302 B2
(45) Date of Patent: Jan. 13, 2026

(54) WIPER SEAL FOR A BALL SCREW ACTUATOR

(71) Applicant: TRELLEBORG SEALING SOLUTIONS US, INC., Ft. Wayne, IN (US)

(72) Inventor: Taylor Macy, South Whitley, IN (US)

(73) Assignee: TRELLEBORG SEALING SOLUTIONS US, INC., Ft. Wayne, IN (US)

( * ) Notice: Subject to any disclaimer, the term of this patent is extended or adjusted under 35 U.S.C. 154(b) by 0 days.

(21) Appl. No.: 18/419,538

(22) Filed: Jan. 22, 2024

(65) Prior Publication Data

US 2024/0247721 A1    Jul. 25, 2024

Related U.S. Application Data

(60) Provisional application No. 63/481,568, filed on Jan. 25, 2023.

(51) Int. Cl.
| | |
|---|---|
| *F16J 15/3284* | (2016.01) |
| *F16H 25/24* | (2006.01) |
| *F16J 15/3204* | (2016.01) |

(52) U.S. Cl.
CPC ...... *F16J 15/3284* (2013.01); *F16H 25/2418* (2013.01); *F16J 15/3204* (2013.01)

(58) Field of Classification Search
CPC .. F16J 15/3204; F16J 15/3216; F16J 15/3232; F16J 15/3284; F16H 25/2418
See application file for complete search history.

(56) References Cited

U.S. PATENT DOCUMENTS

| | | | | |
|---|---|---|---|---|
| 3,646,827 A | * | 3/1972 | Patterson | F16H 25/2418 277/354 |
| 3,669,460 A | * | 6/1972 | Wysong | F16H 25/2418 277/354 |
| 4,052,076 A | * | 10/1977 | Wysong | F16H 25/2418 277/354 |
| 4,053,167 A |   | 10/1977 | Jelinek | |

(Continued)

FOREIGN PATENT DOCUMENTS

| | | |
|---|---|---|
| EP | 3 392 526 B1 | 8/2020 |
| EP | 3 428 481 B1 | 8/2021 |

(Continued)

*Primary Examiner* — Nicholas L Foster
(74) *Attorney, Agent, or Firm* — Orbit IP, LLP; Marc G. Martino

(57) ABSTRACT

A wiper seal assembly for sealing a ball screw actuator has an annularly shaped elastomeric seal element disposed about a longitudinal axis and separates a grease side from an environmental side. An annularly shaped internal support is disposed at least partially within the seal element. The seal element has a first arcuate surface configured to be disposed in an inner helical raceway of a shaft and faces the environmental side. A second arcuate surface is configured to be disposed in the inner helical raceway of the shaft and faces the grease side. An ice scraper seal faces the environmental side and is configured to make contact in at least 360 degrees around the longitudinal axis to or near the inner helical crest of the shaft. The first and second arcuate surfaces and the ice scraper seal the environmental side apart from the grease side.

20 Claims, 11 Drawing Sheets

(56) References Cited

U.S. PATENT DOCUMENTS

| | | | |
|---|---|---|---|
| 4,150,835 A | 4/1979 | Wheelock | |
| 4,407,511 A * | 10/1983 | Benton | F16J 15/16 |
| | | | 277/354 |
| 4,905,533 A * | 3/1990 | Benton | F16H 25/2418 |
| | | | 277/354 |
| 6,216,821 B1 * | 4/2001 | Namimatsu | F16H 25/2418 |
| | | | 184/99 |
| 6,732,599 B2 * | 5/2004 | Michioka | F16H 25/2418 |
| | | | 277/354 |
| 6,931,955 B2 * | 8/2005 | Yatsushiro | F16H 25/2418 |
| | | | 277/354 |
| 6,976,399 B2 | 12/2005 | Michioka et al. | |
| 7,430,933 B2 * | 10/2008 | Yatsushiro | F16H 25/2418 |
| | | | 74/89.44 |
| 7,500,409 B2 * | 3/2009 | Yatsushiro | F16H 25/2418 |
| | | | 74/89.44 |
| 8,025,128 B2 | 9/2011 | Iwasaki | |
| 9,506,544 B2 * | 11/2016 | Iida | F16J 15/3224 |
| 9,784,350 B2 * | 10/2017 | Heck | F16H 25/2418 |
| 9,927,010 B2 * | 3/2018 | Oka | F16H 25/2204 |
| 10,458,530 B2 * | 10/2019 | Davies | F16J 15/32 |
| 10,612,633 B2 | 4/2020 | Nishide et al. | |
| 10,935,116 B2 * | 3/2021 | Kubota | F16H 25/22 |
| 10,975,941 B2 * | 4/2021 | Fages | F16J 15/32 |
| 2002/0062705 A1 * | 5/2002 | Michioka | F16H 25/2418 |
| | | | 277/354 |
| 2002/0144560 A1 * | 10/2002 | Yatsushiro | F16H 25/2418 |
| | | | 74/424.81 |
| 2004/0177711 A1 * | 9/2004 | Michioka | F16H 25/2418 |
| | | | 74/89.4 |
| 2005/0204836 A1 * | 9/2005 | Yatsushiro | F16H 25/2418 |
| | | | 74/89.4 |
| 2005/0241419 A1 * | 11/2005 | Yatsushiro | F16H 25/2418 |
| | | | 74/89.4 |
| 2013/0255419 A1 * | 10/2013 | Iida | F16H 25/24 |
| | | | 74/424.81 |
| 2014/0190287 A1 * | 7/2014 | Garrett | F16H 25/2418 |
| | | | 277/300 |
| 2014/0352470 A1 | 12/2014 | Hsieh | |
| 2015/0122065 A1 * | 5/2015 | Oka | F16H 25/2418 |
| | | | 74/424.81 |
| 2015/0233457 A1 * | 8/2015 | Heck | F16H 25/2204 |
| | | | 29/434 |
| 2017/0030446 A1 * | 2/2017 | Oka | F16H 25/2418 |
| 2018/0306287 A1 * | 10/2018 | Davies | F16H 25/2418 |
| 2019/0017582 A1 * | 1/2019 | Fages | F16H 25/2418 |
| 2024/0247719 A1 * | 7/2024 | Hotnog | F16H 25/2418 |
| 2024/0247720 A1 * | 7/2024 | Wagoner | F16J 15/3284 |

FOREIGN PATENT DOCUMENTS

| | | |
|---|---|---|
| JP | 3647597 B2 | 5/2005 |
| JP | 4923624 B2 | 4/2012 |
| KR | 10-1584435 B1 | 1/2016 |

* cited by examiner

US 12,523,302 B2

WIPER SEAL FOR A BALL SCREW ACTUATOR

CROSS-REFERENCE TO RELATED APPLICATIONS

This application claims priority to provisional application 63/481,568, filed Jan. 25, 2023, the entire contents of which are hereby incorporated in full by this reference.

DESCRIPTION

Field of the Invention

The present invention generally relates to seals. More particularly, the present invention relates to a ball screw seal for a ball screw actuator used in aerospace and industrial applications.

Background of the Invention

Ball screw actuators need seals to seal grease within the actuator. Furthermore, these seals should be able to break externally formed ice while keeping external debris from ingressing (i.e., entering) into the actuator and other flight systems. Current solutions that have been designed are not fully successful in applications with high temperature variability and have had issues with drag. The present invention overcomes these drawbacks.

Prior art publication and patents include but are not limited to the following: EP 3 392 526 B1; EP 3 428 481 B1; U.S. Pat. Nos. 4,905,533; 10,612,633; KR 101 584 435 B1; U.S. Pat. No. 6,976,399B2; JP 492 362 4B2; JP 492 362 4B2; US 201 403 524 70A1; JP 364 759 7B2; U.S. Pat. Nos. 8,025,128B2; 4,905,533A; and EP 3 428 481 B1.

SUMMARY OF THE INVENTION

An exemplary embodiment of a wiper seal assembly 20 of present invention is for a ball screw actuator 1. The ball screw actuator is configured to have an outer housing 2 with a shaft 3 disposed therein. Both the outer housing and the shaft are disposed about a longitudinal axis 4. A plurality of roller balls 5 are movably captured within a roller ball screw thread 6. The roller ball screw thread has an outer helical raceway 7 divided by an outer helical crest 8 which are formed in an inside surface 9 of the outer housing. The roller ball screw thread also has an inner helical raceway 10 divided by an inner helical crest 11 which are formed in the outer surface 12 of the shaft.

The wiper seal assembly comprises an annularly shaped elastomeric seal element 21 disposed about the longitudinal axis configured to separate a grease side 14 from an environmental side 15. The wiper seal assembly also includes an annularly shaped internal support 22 disposed about the longitudinal axis and disposed at least partially within the seal element.

The seal element comprises: a first arcuate surface 23 configured to be disposed in the inner helical raceway of the shaft and facing the environmental side; a second arcuate surface 26 configured to be disposed in the inner helical raceway of the shaft and facing the grease side; and an ice scraper seal 29 facing the environmental side and configured to make contact in at least 360 degrees around the longitudinal axis to or near the inner helical crest of the shaft. The first arcuate surface, the second arcuate surface and the ice scraper are configured to seal the environmental side apart from the grease side when the wiper seal assembly is installed in the ball screw actuator.

In other exemplary embodiments, a first arcuate lip 24 extends from the first arcuate surface towards the environmental side and is configured to make contact with the inner helical raceway of the shaft. A first tapered backside 25 extends away from the first arcuate surface in an opposite direction of the first arcuate lip. The first tapered backside is configured to draft away from the inner helical raceway as it moves further from the first arcuate surface.

In other exemplary embodiments, a second arcuate lip 27 extends from the second arcuate surface towards the grease side and is configured to make contact with the inner helical raceway of the shaft. A second tapered backside 28 extends away from the second arcuate surface in an opposite direction of the second arcuate lip. The second tapered backside is configured to draft away from the inner helical raceway as it moves further from the second arcuate surface. The first tapered backside merges into and connects to the second tapered backside.

DETAILED DESCRIPTION OF EMBODIMENTS OF THE INVENTION

Reference is now made to FIGS. 1-8 of the provisional application 63/481,568. The present invention design is for a ball screw seal that uses a high durometer rubber to seal from the environment, seal in grease, seal on the O.D. against the bore, and also features a rubber ice scraper with a Shore A durometer range of 75-90. This seal also includes a solid metal case that will be used to help support the sealing against the bore. The rubber portion of the seal follows the helical design of the screw thread with the ice scraper going around the thread for one full rotation (360°) and will seal against the major diameter of the thread in the axial direction (environment side). Along with the ice scraper the design has a mirrored dual lip sealing portion that will seal the environment from one side and seal in grease from the other. This portion of the seal will be sealing along the minor diameter of the thread and has a cupped lip design that also drafts away from the sealing surface on both sides. This allows the rubber lip to have some flexibility which will decrease the amount of friction and drag caused by the sealing lip. The mirrored dual lips only go around approximately 20° of the circumference. By using rubber in this design, the seal can both allow flexibility to reduce friction and also can handle larger tolerances within the hardware.]

Figure 1:
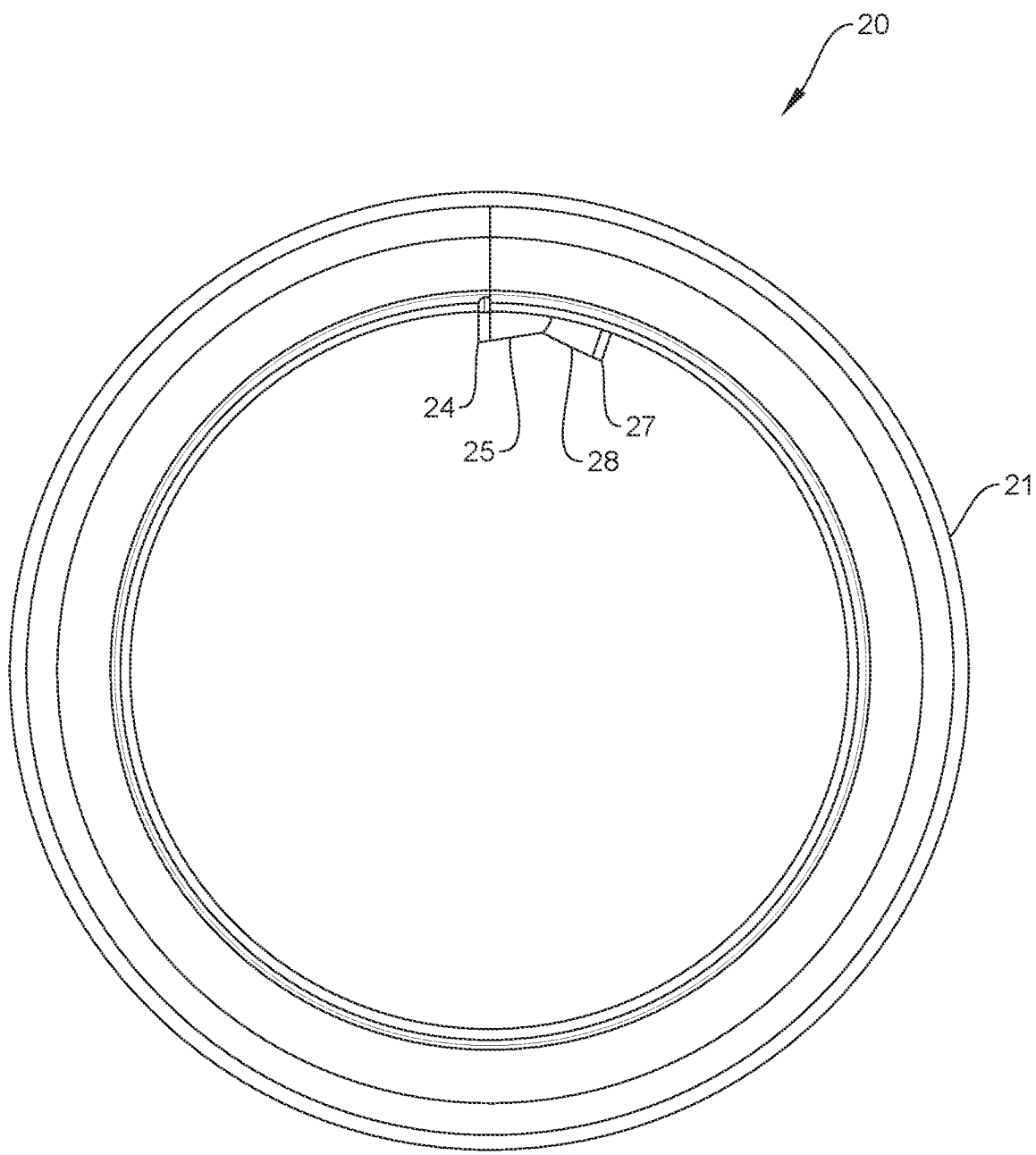
FIG. 1 is a front view of an exemplary embodiment of a wiper seal assembly of the present invention.

FIG. 1 is a front view of a wiper seal of the present invention.

Figure 2:
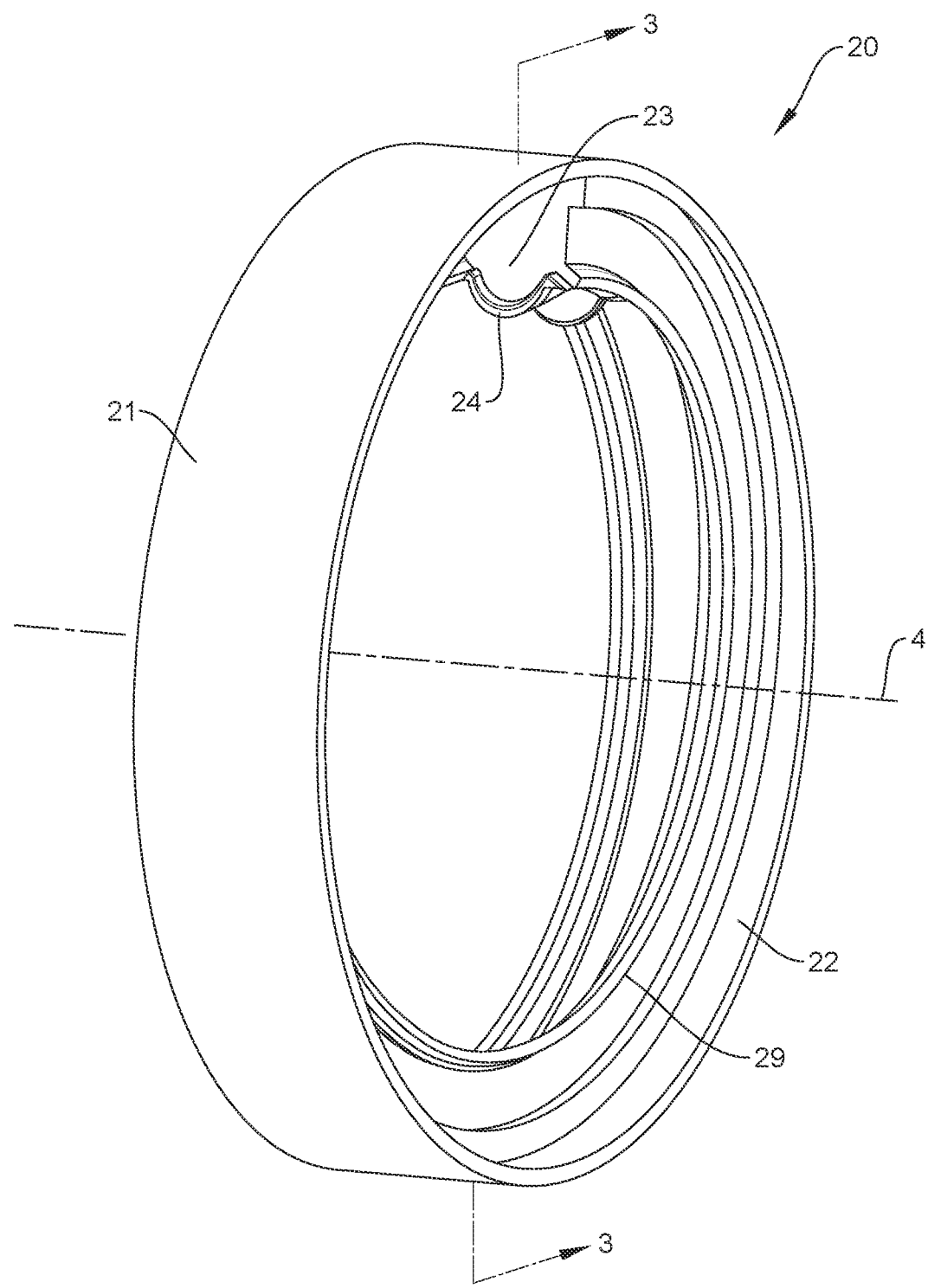
FIG. 2 is an isometric view of the structure of FIG. 1.

FIG. 2 is an isometric view of the structure of FIG. 1.

Figure 3:
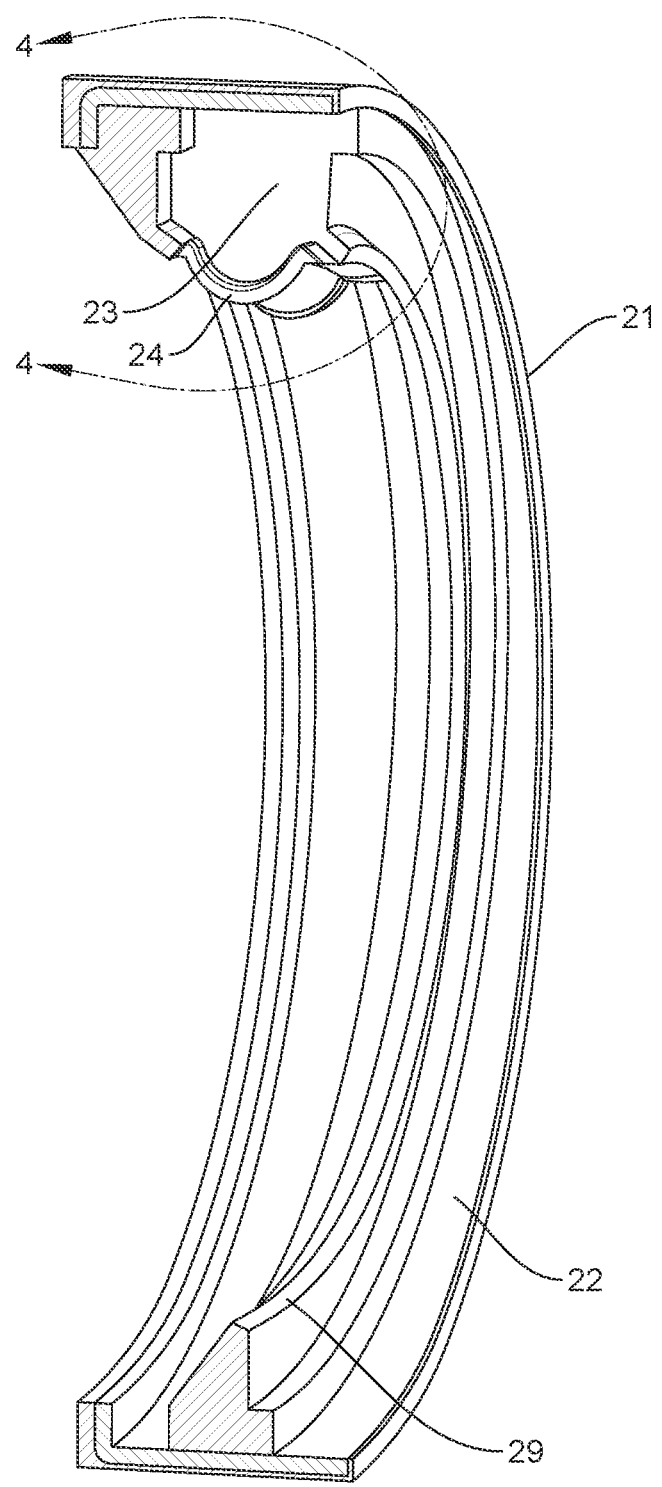
FIG. 3 is a sectional view of the structure of FIG. 2 taken along lines 3-3.

FIG. 3 is a sectional view of the structure of FIG. 1.

Figure 4:
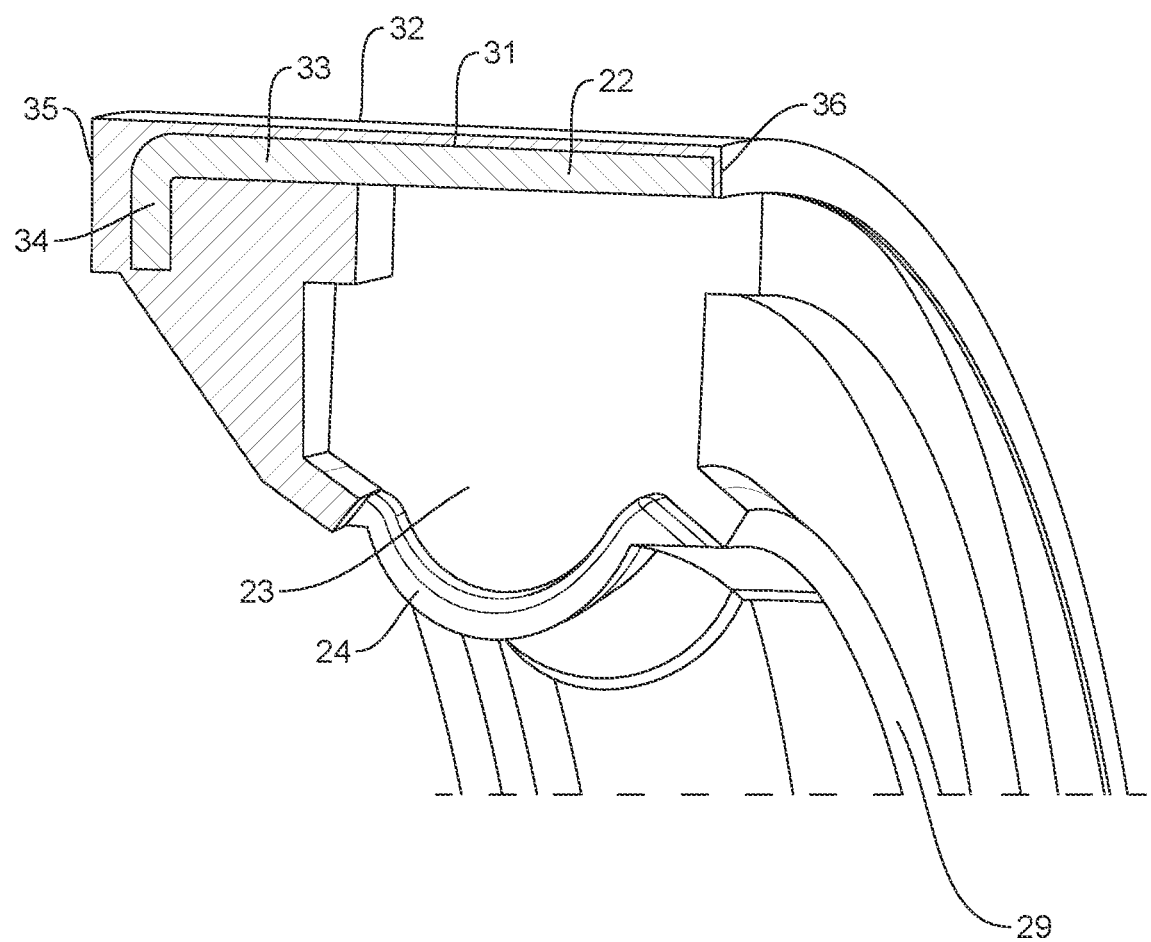
FIG. 4 is an enlarged view taken from the structure of FIG. 3 along lines 4-4.

FIG. 4 is an enlarged view taken from FIG. 3.

Figure 5:
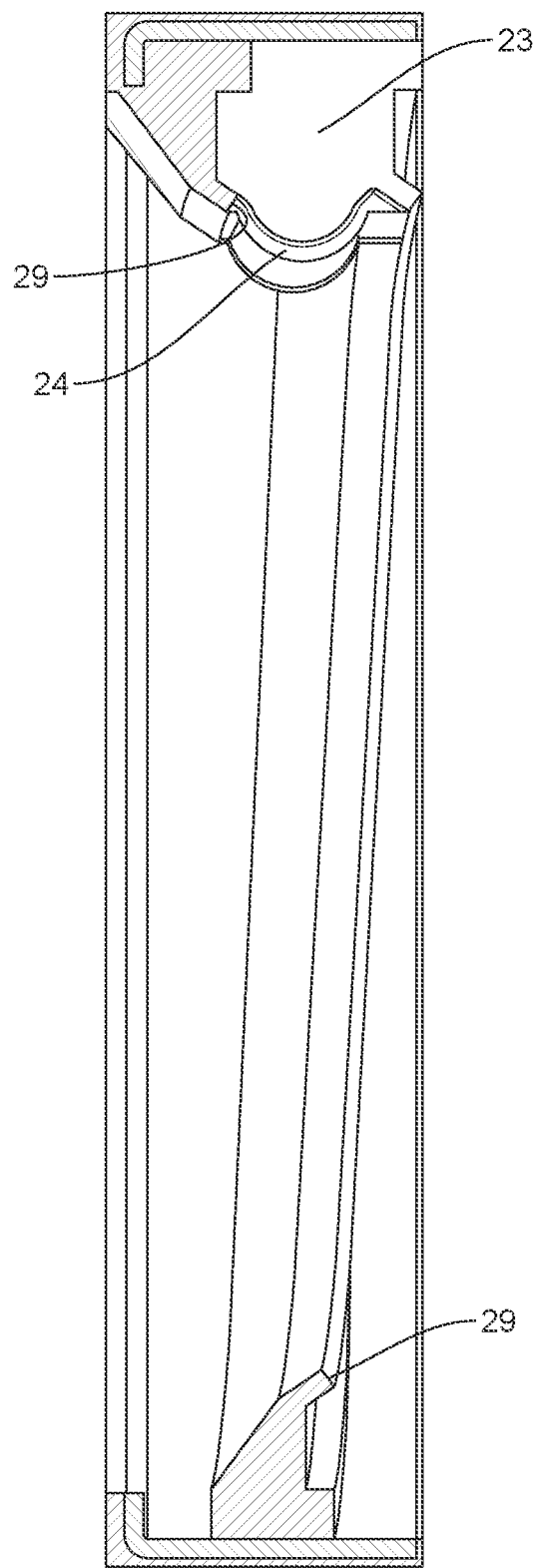
FIG. 5 is a side view of the structure of FIG. 3.

FIG. 5 is a side view of the structure of FIG. 3.

Figure 6:
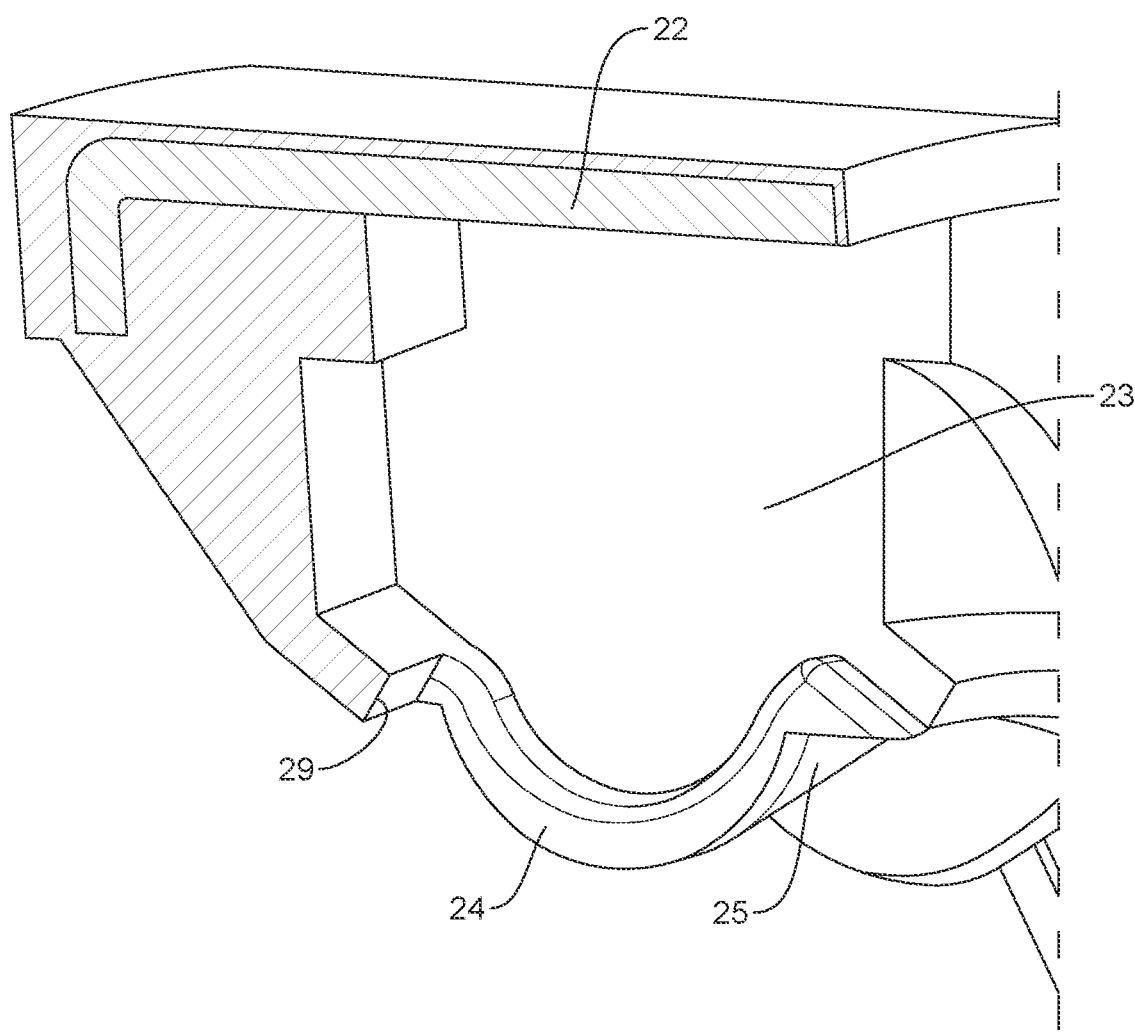
FIG. 6 is another enlarged sectional view similar to FIG. 4 but from a slightly different perspective.

FIG. 6 is an enlarged view of the structure of FIG. 1 inside a housing.

Figure 7:
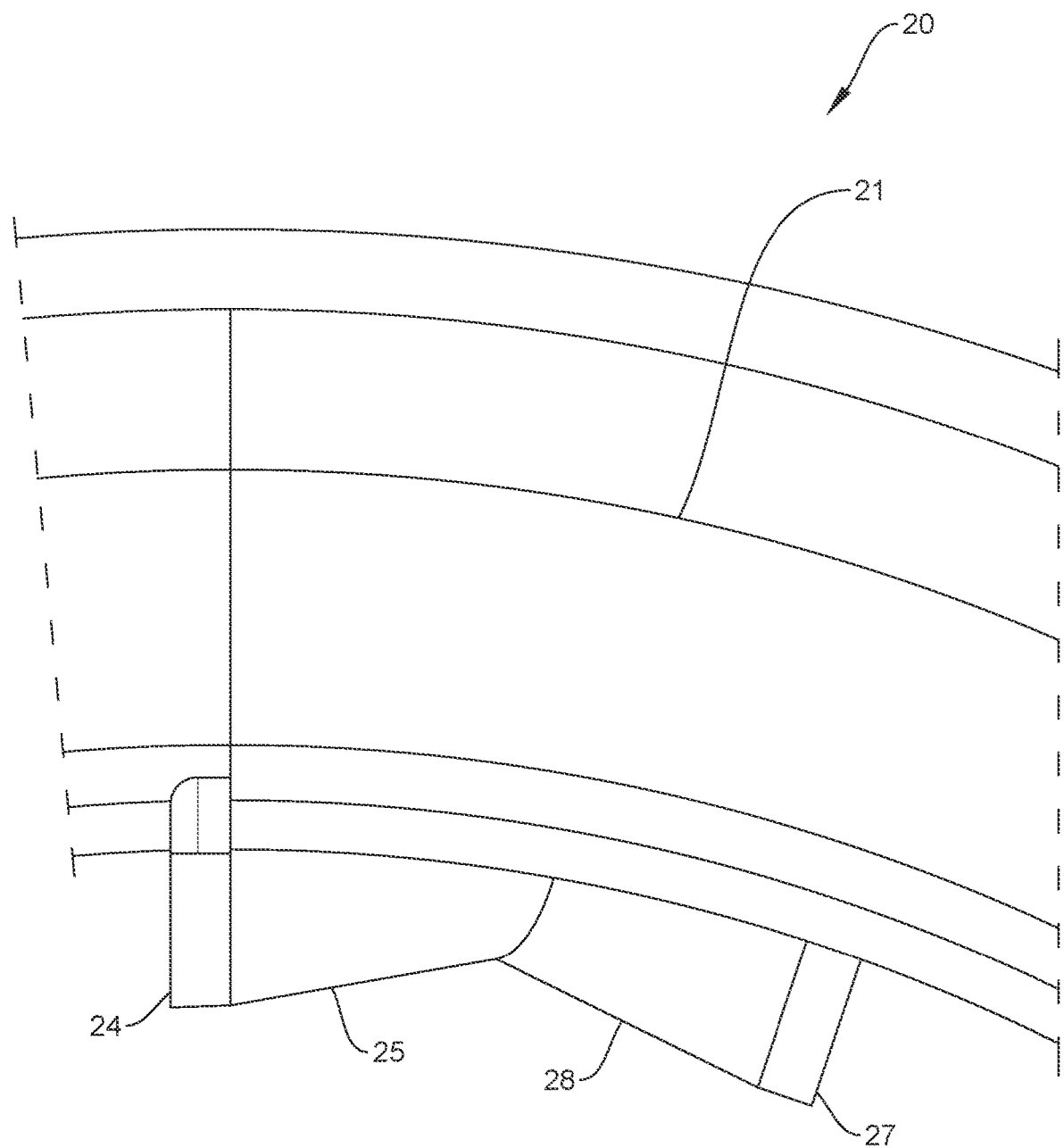
FIG. 7 is an enlarged view of the structure of FIG. 1 better showing the first and second seals that fit in the inner helical raceway of the shaft.

FIG. 7 is an enlarged view from FIG. 1 better showing the wiper.

Figure 8:
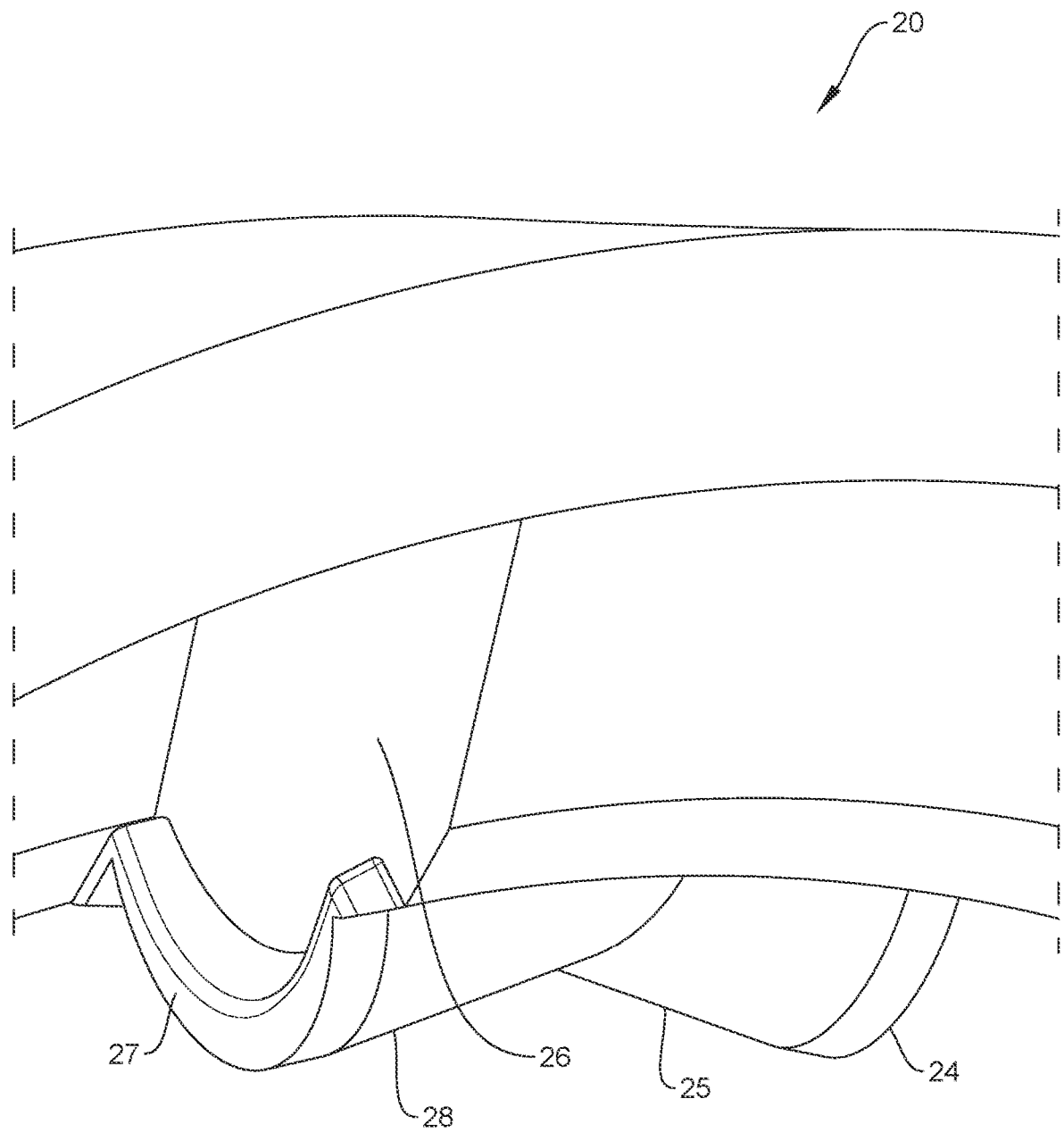
FIG. 8 is enlarged isometric view of the structure of FIG. 7 from an opposite side better showing the grease sealing surfaces.

FIG. 8 is enlarged isometric view of the structure of FIG. 1 better showing the seal for the grease and the seal for the environment.

As shown in FIGS. 1-8, the elastomer contact scraper is supported by a metal can (i.e., frame, support) as best shown in FIGS. 3-6. The rubber outer diameter provides the outer diameter grease sealing. A cupped scraper removes ice along the ball screw thread. The present invention is designed to be lower contact with the surface to promote lower drag sealing.

The metal can adds structural support to the wiper seal assembly. The metal can be made from a variety of metals known to those skilled in the art. Furthermore, the can may also be made from plastics, composites, metals or any combination thereof. The can may be bonded or adhered to the elastomer contact scraper or the elastomer contact scraper may be over-molded onto the can.

This seal is designed in a helical shape to seal around the outer diameter of the seal with elastomer contact as well as seal along the thread of the screw. The seal will have a sealing lip that will seal on the minor diameter against the environment but will also have a sealing lip mirrored on the other side to seal in the grease. The design will also have a scraper lip that runs along the major diameter of the thread that will scrape off ice in the axial direction.

The scraper seals about 360°, but the secondary seals that seal along the minor diameter on both the environment and grease side only goes around the circumference around 20°.

The difference of this design compared to prior art is that this design uses elastomer contacts to both seal and scrape (at different locations) in the application and will allow the seals to be flexible.

This seal design will allow the seal to have some flexibility that will allow for the design to seal and scrape against the tolerances of the application. Another advantage is that by having the sealing lip draft away from the sealing point, you get the benefits of an elastomer contact seal but with less contact which will lower friction.

The scraper will be an elastomer seal that will be sealing against the crest (major diameter) of the screw thread and sealing in the axial direction. As the screw turns, the scraper will scrape the ice off the major diameter as it turns. There will also be a secondary sealing/scraping component that works in the root (minor diameter) of the screw thread in the radial direction. This will allow the ice and debris to be scraped off the minor diameter of the seal as the screw turns.

The present invention is designed to be lower contact with the surface to promote lower drag sealing as compared to prior art designs. The sealing lip that works in the root of the thread in the radial direction is designed with a draft away from the sealing edge. This will allow the seal to have some room to deform which will allow a lower friction force and lower drag as the ball screw rotates.

Figure 9:
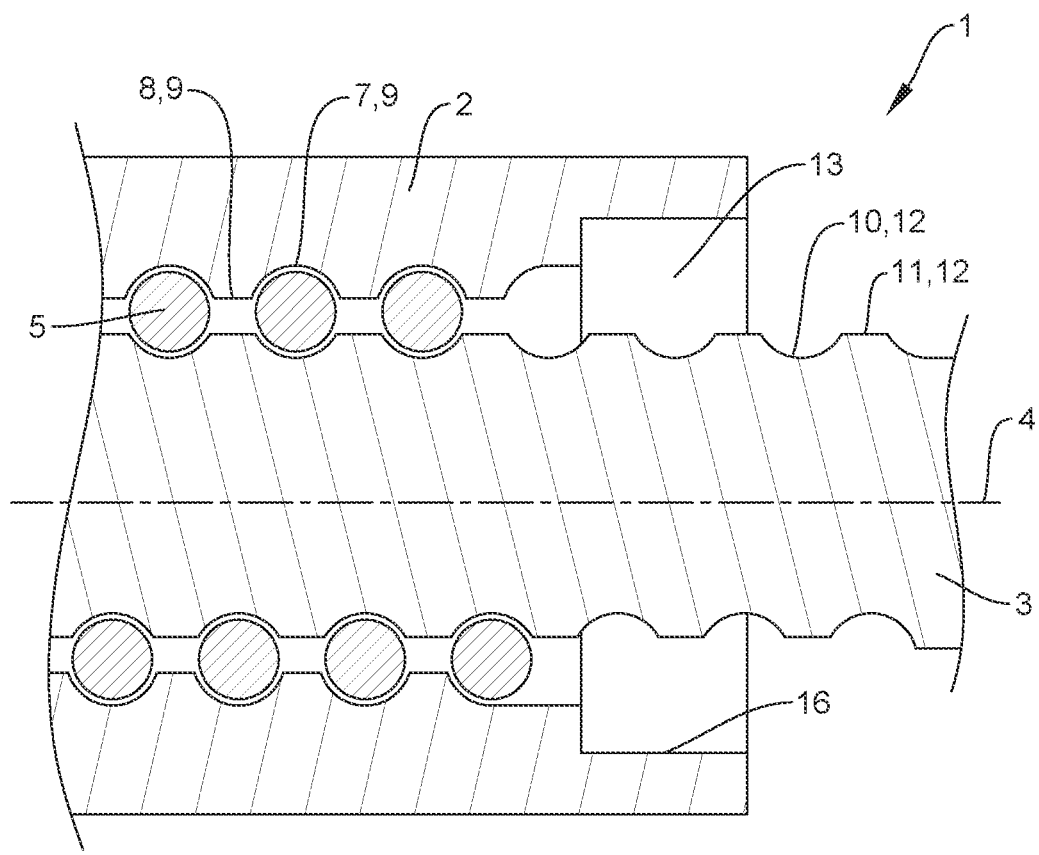
FIG. 9 is a simplified sectional view of a ball screw actuator without a wiper seal assembly.
Figure 10:
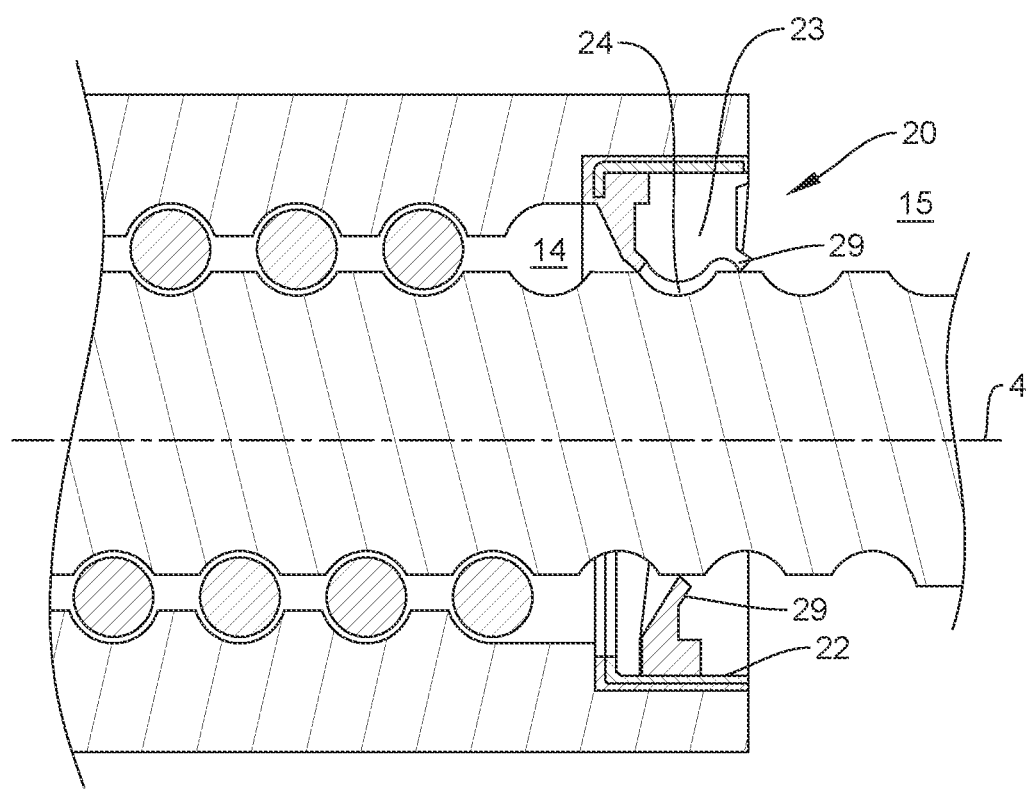
FIG. 10 is similar to the simplified sectional view of the ball screw actuator now with an embodiment of a wiper seal assembly of the present invention.
Figure 11:
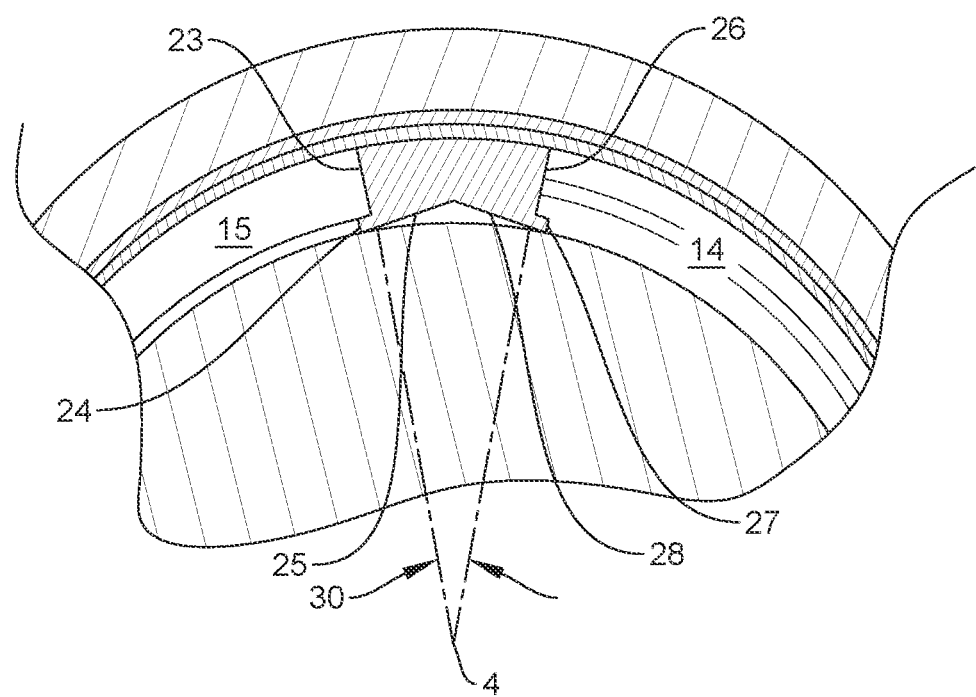
FIG. 11 is a theoretical sectional view taken along the helical thread of the ball screw actuator showing the first and second arcuate surfaces for a better understanding.

Reference is now being made to the figures of the present application which are very similar to the figures of the '568 provisional application. FIGS. 1-8 of the present application illustrate an embodiment of a wiper seal assembly 20 of the present invention. To aid in further understanding of the invention FIGS. 9-11 show additional views. FIG. 9 is a simplified sectional view of a ball screw actuator without a wiper seal assembly. FIG. 10 is similar to the simplified sectional view of the ball screw actuator now with an embodiment of a wiper seal assembly of the present invention. FIG. 11 is a theoretical sectional view taken along the helical thread of the ball screw actuator showing the first and second arcuate surfaces for a better understanding.

Jumping to FIG. 9, a ball screw actuator 1 is configured to have an outer housing 2 with a shaft 3 disposed therein. Both the outer housing and the shaft are disposed about a longitudinal axis 4. A plurality of roller balls 5 are movably captured within a roller ball screw thread 6. The roller ball screw thread has an outer helical raceway 7 divided by an outer helical crest 8 which are formed in an inside surface 9 of the outer housing. The roller ball screw thread also has an inner helical raceway 10 divided by an inner helical crest 11 which are formed in the outer surface 12 of the shaft. An annular channel 13 is formed in the outer housing such that the present invention may be placed within. FIG. 10 shows the wiper seal assembly 20 of the present invention installed in the annular channel 13.

The wiper seal assembly comprises an annularly shaped elastomeric seal element 21 disposed about the longitudinal axis configured to separate a grease side 14 from an environmental side 15. The wiper seal assembly also includes an annularly shaped internal support 22 disposed about the longitudinal axis and disposed at least partially within the seal element. The seal element may be made of PTFE, unfilled PTFE, blended PTFE, glass moly filled PTFE, PEEK and/or thermoplastic material.

The seal element comprises a first arcuate surface 23 configured to be disposed in the inner helical raceway of the shaft and facing the environmental side. A first arcuate lip 24 extends from the first arcuate surface towards the environmental side and is configured to make contact with the inner helical raceway of the shaft. A first tapered backside 25 extends away from the first arcuate surface in an opposite direction of the first arcuate lip. The first tapered backside is configured to draft away from the inner helical raceway as it moves further from the first arcuate surface.

A second arcuate surface 26 is configured to be disposed in the inner helical raceway of the shaft and facing the grease side. A second arcuate lip 27 extends from the second arcuate surface towards the grease side and is configured to make contact with the inner helical raceway of the shaft. A second tapered backside 28 extends away from the second arcuate surface in an opposite direction of the second arcuate lip. The second tapered backside is configured to draft away from the inner helical raceway as it moves further from the second arcuate surface. The first tapered backside merges into and connects to the second tapered backside.

An ice scraper seal 29 faces the environmental side and is configured to make contact in at least 360 degrees around the longitudinal axis to or near the inner helical crest of the shaft. In combination, the first arcuate surface, the second arcuate surface and the ice scraper are configured to seal the environmental side apart from the grease side when the wiper seal assembly is installed in the ball screw actuator.

As shown in FIG. 11 the first arcuate surface 23 is disposed opposite the second arcuate surface 26, where they are separated by an angle 30, which angle is about 20 degrees. In other embodiments, the angle 30 may be less than 45 degrees and less than 25 degrees.

The seal element material is also disposed on the outside surface 31 to form a thin layer 32. This this layer 32 can then form a seal to the inside surface 16 of the annular channel 13. Furthermore, the internal support 22 in cross section can be L-shaped, such that it has a first portion 33 that is perpendicular to a second portion 34. The L-shape of the internal support creates rigidity to the overall wiper seal assembly.

The seal element 21 of the wiper seal assembly can also extend to a grease side end and an environmental side end as best shown in FIG. 4.

The seal element 21 of the wiper seal assembly can be over-molded to the internal support 22 to create a good bonding between the different materials. Alternatively, the seal element 21 could be bonded or adhered to the internal support.

NUMERALS 1 ball screw actuator
2 outer housing
3 shaft
4 longitudinal axis
5 plurality of roller balls
6 roller ball screw thread
7 outer helical raceway
8 outer helical crest
9 inside surface
10 inner helical raceway
11 inner helical crest
12 outer surface
13 annular channel
14 grease side
15 environmental side
16 inside surface, annular channel, outer housing
20 wiper seal assembly
21 seal element
22 internal support
23 first arcuate surface
24 first arcuate lip
25 first tapered backside
26 second arcuate surface
27 second arcuate lip
28 second tapered backside
29 ice scraper seal
30 angle
31 outside surface, internal support
32 thin layer, seal element
33 first portion, internal support
34 second portion, internal support
35 grease side end, seal element
36 environmental side end, seal element

What is claimed is:

1. A wiper seal assembly configured for sealing a ball screw actuator, wherein the ball screw actuator is configured to have an outer housing with a shaft disposed therein, wherein both the outer housing and the shaft are disposed about a longitudinal axis, and a plurality of roller balls are movably captured within a roller ball screw thread, the roller ball screw thread having an outer helical raceway divided by an outer helical crest which is formed in an inside surface of the outer housing and an inner helical raceway divided by an inner helical crest which are formed in the outer surface of the shaft, the wiper seal assembly comprising:
   an annularly shaped resilient seal element disposed about the longitudinal axis configured to separate a grease side from an environmental side; and
   an annularly shaped internal support disposed about the longitudinal axis and disposed at least partially within the seal element;
   wherein the seal element comprises:
     a first arcuately-edged surface comprising a first flat surface with a first arcuate edge, wherein the first arcuate edge is configured to be disposed in and abutting the inner helical raceway of the shaft, and wherein the first flat surface is configured to be parallel with the longitudinal axis and exposed on the environmental side;
     a second arcuately-edged surface comprising a second flat surface with a second arcuate edge, where the second arcuate edge is configured to be disposed in and abutting the inner helical raceway of the shaft, and wherein the second flat surface is configured to be parallel with the longitudinal axis and exposed on the grease side;
     an ice scraper seal facing the environmental side and configured to make contact in at least 360 degrees around the longitudinal axis to or near the inner helical crest of the shaft;
   wherein the first arcuate surface, the second arcuate surface and the ice scraper are configured to seal the environmental side apart from the grease side when the wiper seal assembly is installed in the ball screw actuator.

2. The wiper seal assembly of claim 1, wherein the seal element has a Shore A hardness durometer range of 75 to 90.

3. The wiper seal assembly of claim 1, wherein the seal element is made of PTFE, unfilled PTFE, blended PTFE, glass moly filled PTFE, PEEK or thermoplastic material.

4. The wiper seal assembly of claim 1, wherein the internal support and the seal element are not made of the same materials.

5. The wiper seal assembly of claim 1, wherein the internal support is made of metal, plastic, composites or combinations thereof.

6. The wiper seal assembly of claim 1, wherein the seal element is an over-mold about the internal support.

7. The wiper seal assembly of claim 1, wherein the seal element is bonded or adhered to the internal support.

8. The wiper seal assembly of claim 1, wherein the internal support, in a cross-section taken through the longitudinal axis, has an L-shape.

9. The wiper seal assembly of claim 1, including a first arcuate lip extending from the first arcuate edge of the first arcuately-edged surface towards the environmental side and configured to make contact with the inner helical raceway of the shaft.

10. The wiper seal assembly of claim 9, including a first tapered backside extending away from the first flat surface in an opposite direction of the first arcuate lip, the first tapered backside configured to draft away from the inner helical raceway as it moves further from the first flat surface.

11. The wiper seal assembly of claim 10, including a second arcuate lip extending from the second arcuate edge of the second arcuately-edged surface towards the grease side and configured to make contact with the inner helical raceway of the shaft.

12. The wiper seal assembly of claim 11, including a second tapered backside extending away from the second flat surface in an opposite direction of the second arcuate lip, the second tapered backside configured to draft away from the inner helical raceway as it moves further from the second flat surface.

13. The wiper seal assembly of claim 12, wherein the first tapered backside connects to the second tapered backside.

14. The wiper seal assembly of claim 13, wherein the first flat surface and the second flat surface are less than 45 degrees apart about the longitudinal axis.

15. The wiper seal assembly of claim 13, wherein the first flat surface and the second flat surface are less than 25 degrees apart about the longitudinal axis.

16. The wiper seal assembly of claim 13, wherein the first flat surface and the second flat surface are 20 degrees apart about the longitudinal axis.

17. The wiper seal assembly of claim 1, including a layer of seal element disposed on an outside surface of the internal support.

18. The wiper seal assembly of claim 1, wherein the first flat surface is disposed less than 45 degrees about the longitudinal axis from the second flat surface.

19. A wiper seal assembly configured for sealing a ball screw actuator, wherein the ball screw actuator is configured to have an outer housing with a shaft disposed therein, wherein both the outer housing and the shaft are disposed about a longitudinal axis, and a plurality of roller balls are movably captured within a roller ball screw thread, the roller ball screw thread having an outer helical raceway divided by an outer helical crest which is formed in an inside surface of the outer housing and an inner helical raceway divided by an inner helical crest which are formed in the outer surface of the shaft, the wiper seal assembly comprising:
   an annularly shaped resilient seal element disposed about the longitudinal axis configured to separate a grease side from an environmental side; and
   an annularly shaped internal support disposed about the longitudinal axis and disposed at least partially within the seal element;
   wherein the seal element comprises:
      a first arcuately-edged surface comprising a first flat surface with a first arcuate edge, wherein the first arcuate edge is configured to be disposed in and adjacent the inner helical raceway of the shaft, and wherein the first flat surface is configured to be parallel with the longitudinal axis and exposed on the environmental side;
      a first arcuate lip extending from the first arcuate edge towards the environmental side and configured to make contact with the inner helical raceway of the shaft;
      a first tapered backside extending away from the first flat surface in an opposite direction of the first arcuate lip, the first tapered backside configured to draft away from the inner helical raceway as it moves further from the first flat surface;
      a second arcuately-edged surface comprising a second flat surface with a second arcuate edge, wherein the second arcuate edge is configured to be disposed in and adjacent the inner helical raceway of the shaft, and wherein the second flat surface is configured to be parallel with the longitudinal axis and exposed on the grease side;
      a second arcuate lip extending from the second flat surface towards the grease side and configured to make contact with the inner helical raceway of the shaft;
      a second tapered backside extending away from the second flat surface in an opposite direction of the second arcuate lip, the second tapered backside configured to draft away from the inner helical raceway as it moves further from the second flat surface;
      an ice scraper seal facing the environmental side and configured to make contact in at least 360 degrees around the longitudinal axis to or near the inner helical crest of the shaft;
      wherein the first arcuate surface, the second arcuate surface and the ice scraper are configured to seal the environmental side apart from the grease side when the wiper seal assembly is installed in the ball screw actuator.

20. The wiper seal assembly of claim 19, wherein the first flat surface is disposed less than 45 degrees about the longitudinal axis from the second flat surface.

* * * * *